(12) United States Patent
Song

(10) Patent No.: US 6,866,917 B2
(45) Date of Patent: Mar. 15, 2005

(54) SUBSTRATE FOR LIQUID CRYSTAL DISPLAY AND METHOD OF FABRICATING THE SAME

(75) Inventor: Jang-Kun Song, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 15 days.

(21) Appl. No.: 10/040,478

(22) Filed: Jan. 9, 2002

(65) Prior Publication Data

US 2002/0090494 A1 Jul. 11, 2002

(30) Foreign Application Priority Data

Jan. 9, 2001 (KR) .................................. 10-2001-0001138

(51) Int. Cl.[7] .............................. B32B 3/00; G02C 1/02; G02B 5/22
(52) U.S. Cl. ...................... 428/172; 428/1.1; 428/204; 428/207; 359/891; 349/106; 349/110
(58) Field of Search ..................... 428/1.1, 167, 172, 428/195.1, 201, 204, 207; 359/885, 891; 349/77, 78, 80, 106, 110

(56) References Cited

U.S. PATENT DOCUMENTS 6,099,993 A * 8/2000 Kim et al. .................. 349/106
6,208,394 B1 * 3/2001 Tanaka et al. .............. 349/106

* cited by examiner

*Primary Examiner*—Donald J. Loney
(74) *Attorney, Agent, or Firm*—McGuireWoods LLP

(57) ABSTRACT

A color filter substrate for a liquid crystal display includes a transparent substrate, and color filters formed on the substrate each with a groove. A transparent conductive layer is deposited onto the color filters to form a common electrode. A chrome layer and a chrome oxide layer are sequentially deposited onto the common electrode to form a black matrix layer. An organic film is formed on the black matrix layer. The organic film suffers ashing such that only the portion of the organic film placed over the groove is left over, and other portions are all removed while exposing the black matrix layer. The exposed portion of the black matrix layer is removed through etching. In this way, the color filter substrate is completed in a simple manner.

8 Claims, 12 Drawing Sheets

SUBSTRATE FOR LIQUID CRYSTAL DISPLAY AND METHOD OF FABRICATING THE SAME

BACKGROUND OF THE INVENTION (a) Field of the Invention

The present invention relates to a liquid crystal display and, more particularly, to a color filter substrate for a liquid crystal display.

(b) Description of the Related Art

Generally, liquid crystal displays have a structure where a liquid crystal is sandwiched between two substrates, and an electric field is applied to the liquid crystal to control light transmission. Among the substrates, the bottom substrate is provided with thin film transistors and pixel electrodes, and usually called the "thin film transistor array substrate." The top substrate is provided with a common electrode and color filters, and usually called the "color filter substrate."

In order to fabricate such a liquid crystal display at a lower cost within reduced time period, it is necessary to simplify the photolithography process that involves complicated processing steps.

FIGS. 1A through 1D sequentially illustrate the steps of fabricating a color filter substrate for a liquid crystal display according to a prior art.

As shown in FIG. 1A, a chrome oxide layer 21 and a chrome layer 22 are sequentially deposited onto a transparent glass substrate 10, and patterned through photolithography to thereby form a black matrix 20.

As shown in FIG. 1B, color filters 30 of red, green and blue colors are formed on the substrate 10 with the black matrix 20 though performing photography three times. In the photography process, a layer based on a photosensitive material containing pigment is deposited onto the substrate 10, exposed to light, and developed.

As shown in FIG. 1C, a common electrode 40 is formed on the color filters 30 with a transparent conductive material such as indium tin oxide (ITO).

In the case of twisted nematic (TN) mode liquid crystal displays, the color filter substrate is completed through the above processing steps. That is, the color filter substrate is fabricated through performing photolithography one time, and photography three times.

However, in case opening portions are formed at the common electrode and the pixel electrodes to obtain wide viewing angle characteristic with a patterned vertically aligned (PVA) mode, an additional process of photolithography should be introduced. That is, as shown in FIG. 1D, opening portions 41 are formed at the common electrode 40 through photolithography.

Furthermore, when the opening portions 41 are formed at the common electrode 40, the color filters 30 suffer damages during the etching process while being exposed through the opening portions 41, and this deteriorates the property of the liquid crystal.

In order to solve such problems, it has been suggested that protrusions based on an organic material should be formed at the common electrode 40 instead of the opening portions 41, or opening portions and protrusions should be formed only at the pixel electrodes without patterning the common electrode 40. However, such techniques yet involve complicated processing steps and does not provide sufficient wide viewing angle.

SUMMARY OF THE INVENTION

It is an object of the present invention to provide a method of fabricating a color filter substrate for a liquid crystal display which involves simplified processing steps.

It is another object of the present invention to provide a liquid crystal display which bears improved wide viewing angle characteristic.

These and other objects may be achieved by a color filter substrate for a liquid crystal display with the following features.

According to one aspect of the present invention, the color filter substrate includes a transparent substrate, and color filters formed on the substrate each with a groove. A first transparent conductive layer covers the color filters, and a black matrix is formed on the first transparent conductive layer within the groove of each color filter.

The groove of each color filter may be filled with an organic film or a photosensitive film. The photosensitive film is preferably covered with a second transparent conductive layer. It is preferable that the black matrix is formed with a double-layered structure where a chrome layer and a chrome oxide layer are present. Alternatively, the black matrix may be formed with an organic material. The black matrix has first portions formed at the area between the neighboring color filters, and second portions formed at the area within each color filter while partitioning the color filter into a plurality of domains.

According to another aspect of the present invention, the color filter has a transparent substrate, and color filters formed on the substrate each with a groove. A black matrix is placed within the groove of each color filter, and a transparent conductive layer is formed on the black matrix.

The groove of each color filter may be filled with an organic material.

In a method of fabricating the color filter substrate, color filters are formed on a transparent substrate such that each color filter has a groove. A first transparent conductive layer is formed on the color filters. A black matrix layer is deposited onto the first transparent conductive layer. A gap filler is formed on the black matrix layer such that the gap filler fills the groove of each color filter. The exposed portion of the black matrix layer is removed through etching.

The gap filler may be formed either through coating an organic film onto the black matrix layer, and ashing the organic film, or through coating a photosensitive film onto the black matrix layer, exposing the photosensitive film to light, and developing the light-exposed film. It is preferable that the black matrix layer should be formed through sequentially depositing a chrome layer and a chrome oxide layer onto the first transparent conductive layer. Furthermore, a second transparent conductive layer may be formed on the gap filler.

In another method of fabricating the color filter substrate, color filters are formed on a transparent substrate such that each color filter has a groove. A first transparent conductive layer is formed on the color filters. A black matrix is formed on the first transparent conductive layer such that the black matrix fills the groove of each color filter.

A second transparent conductive layer may be formed on the black matrix.

In still another method of fabricating the color filter substrate, color filters are formed on a transparent substrate such that each color filter has a groove. A black matrix layer is deposited onto the color filters. A gap filler is formed on the black matrix layer such that the gap filler fills the groove of each color filter. The exposed portion of the black matrix layer is removed through etching. A transparent conductive layer is formed on the gap filler.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components.

DETAILED DESCRIPTION OF THE PREFERRED EMBODIMENTS

Preferred embodiments of this invention will be explained with reference to the accompanying drawings.

FIGS. 2A through 2F illustrate the steps of fabricating a color filter substrate for a liquid crystal display according to a first preferred embodiment of the present invention.

Figure 1A:
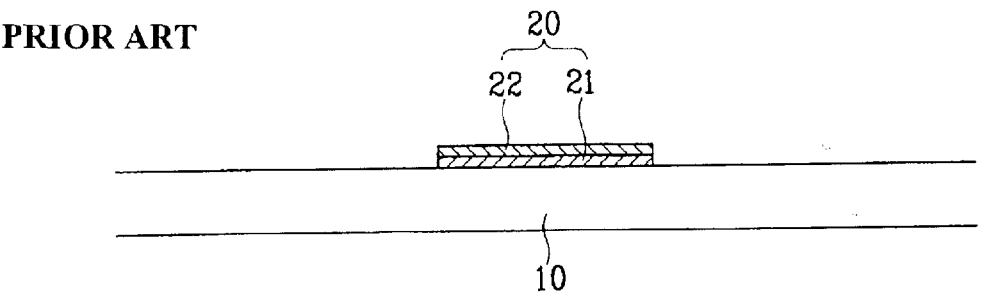
FIGS. 1A, 1B, 1C and 1D sequentially illustrate the steps of fabricating a color filter substrate for a liquid crystal display according to a prior art.
Figure 1B:
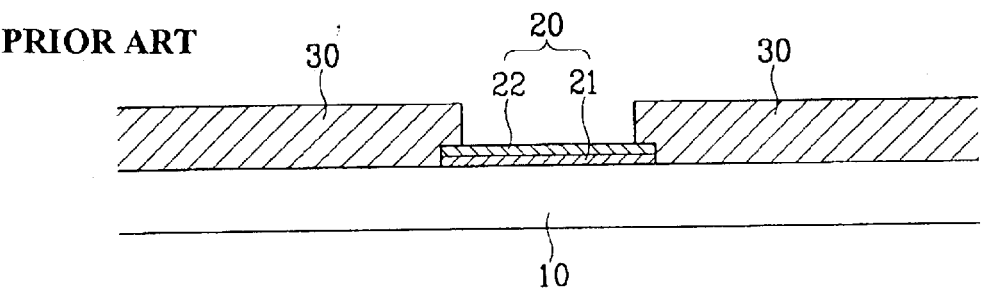
Figure 1C:
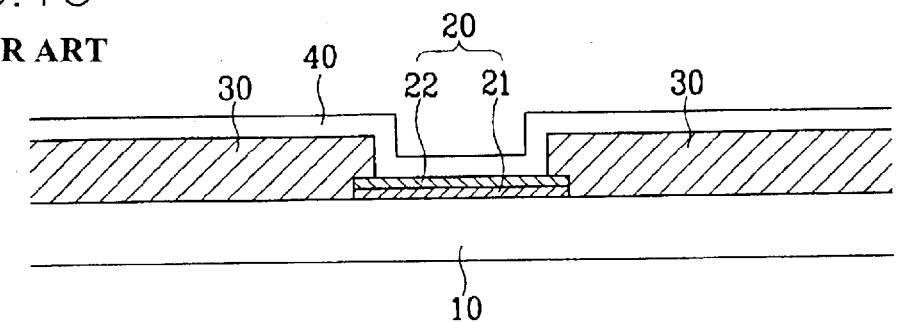
Figure 1D:
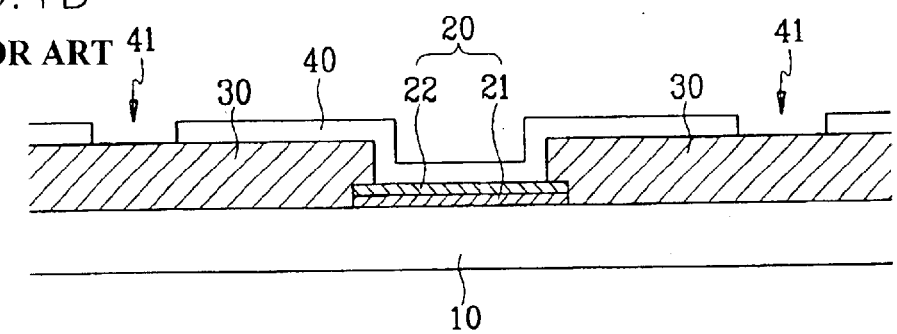
Figure 2A:
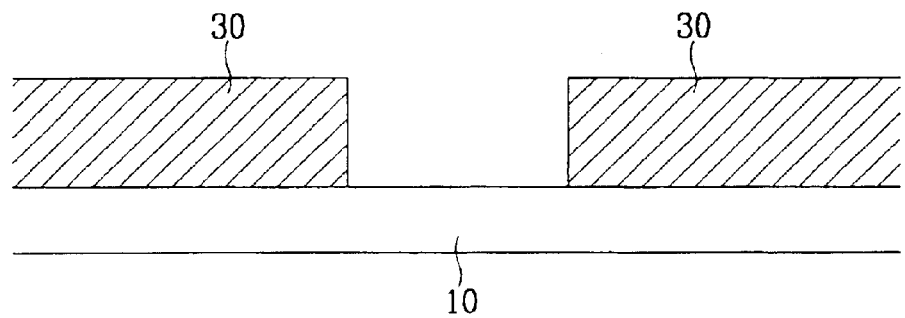
FIGS. 2A, 2B, 2C, 2D, 2E and 2F sequentially illustrate the steps of fabricating a color filter substrate for a liquid crystal display according to a first preferred embodiment of the present invention.

As shown in FIG. 2A, color filters 30 of red, green and blue colors are formed on a transparent insulating substrate 10 through performing photography three times. That is, as related to each color, a layer based on a photosensitive material containing pigment is deposited onto the substrate 10, exposed to light through a mask, and developed. A groove is formed at a predetermined portion in order to make a domain partitioning pattern) of each color filter 30, and at the area between the neighboring color filters 30. It is preferable that the groove should bear a depth so large as to expose the underlying transparent substrate 10. The width of the groove is preferably in the range of 5–15 µm, more preferably about 8 µm.

Figure 2B:
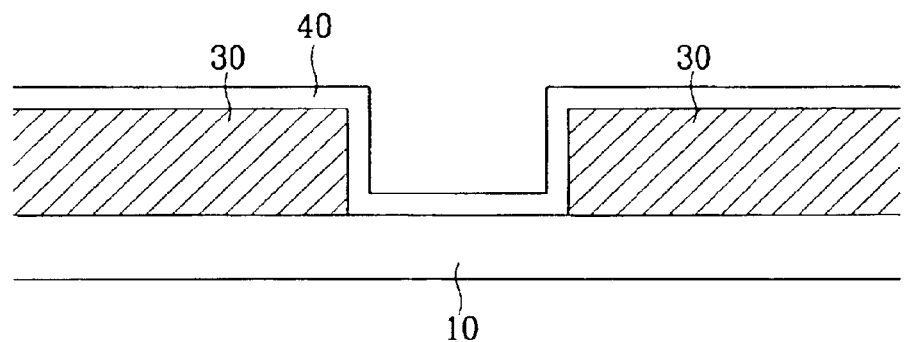

As shown in FIG. 2B, a common electrode 40 is formed on the color filters 30 with a transparent conductive material such as indium tin oxide (ITO) and indium zinc oxide (IZO).

Figure 2C:
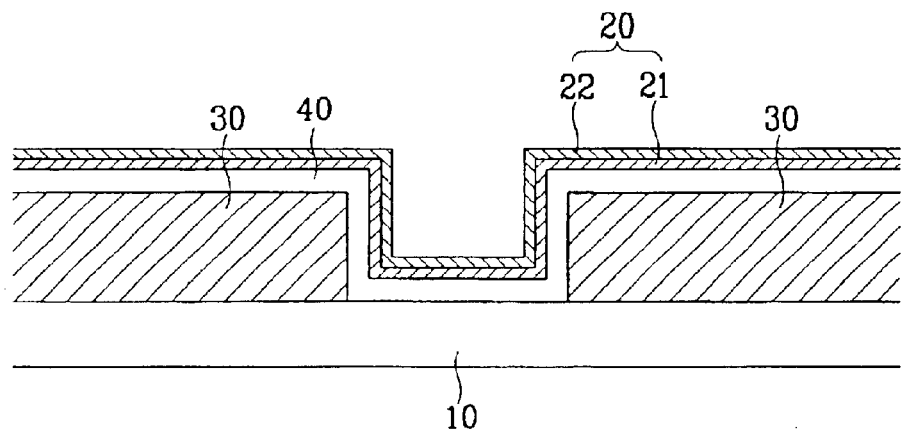

As shown in FIG. 2C, a chrome oxide layer 21, and a chrome layer 22 are sequentially deposited onto the common electrode 40 to thereby form a black matrix layer 20.

Figure 2D:
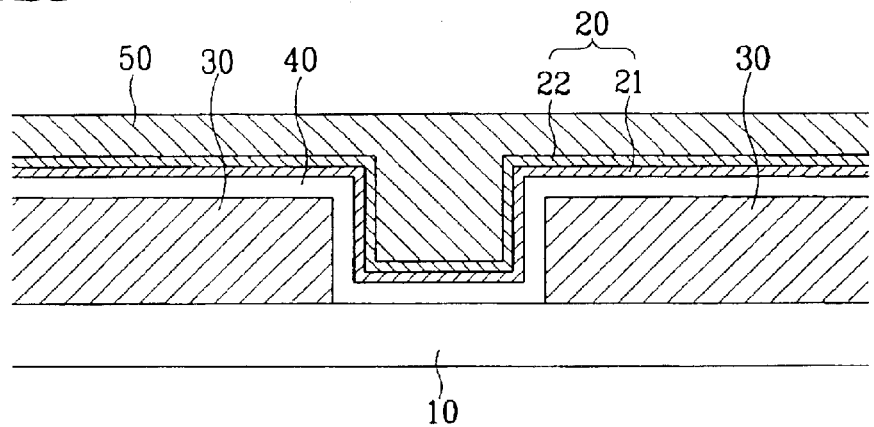

As shown in FIG. 2D, an organic film 50 is coated onto the black matrix layer 20. The organic film 50 may be formed with an acryl-based material, or a BCB-based material. The BCB-based material is preferred for the organic film 50 in view of wide viewing angle characteristic. The organic film 50 preferably has a thin thickness of 0.5–3.5 µm while filling the groove.

Figure 2E:
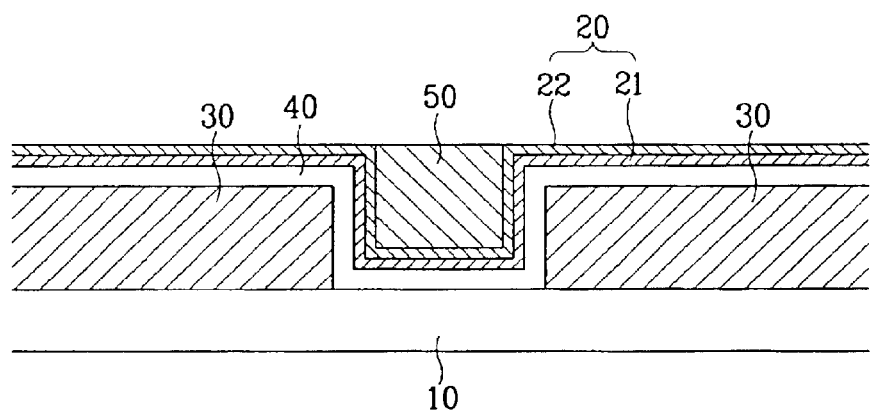

As shown in FIG. 2E, the organic film 50 suffers ashing through dry etching such that only the portion thereof at the groove is left over, and other portions are all removed while exposing the underlying black matrix layer 20. The dry etching usually bears an etching ratio of 150 Å per second. Thus, assuming that the organic film 50 has a thickness of about 1.5 µm, one hundred seconds are consumed for the etching. At this time, over-etching of 5–50% is preferably made to obtain sufficient margin.

Figure 2F:
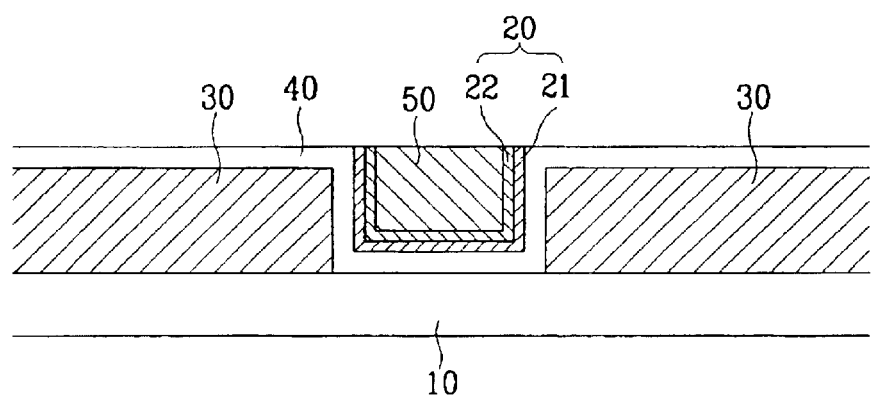

Finally, as shown in FIG. 2F, the exposed portion of the black matrix layer 20 is removed through etching. At this time, the portion of the black matrix layer 20 at the groove is left over while being protected by the organic film 50.

Consequently, a color filter substrate is completed. The black matrix prevents leakage of light. The groove as well as the organic film filling the groove controls the inclining directions of the liquid crystal molecules.

In the above process, only photography is made three times without introducing photolithography. Therefore, compared to the conventional process of fabricating a TN mode color filter substrate, the process of the present invention eliminated the photolithography step. Furthermore, compared to the conventional process of fabricating a PVA mode color filter substrate, the present process eliminated two steps of photography. In this way, the steps of processing the color filter substrate can be simplified. Furthermore, forming the black matrix through self alignment can prevent decrease in the opening ratio due to the misalignment of the mask.

FIGS. 3A through 3E illustrates the steps of fabricating a color filter substrate for a liquid crystal display according a second preferred embodiment of the present invention. In this preferred embodiment, the black matrix is formed with an organic material.

Figure 3A:
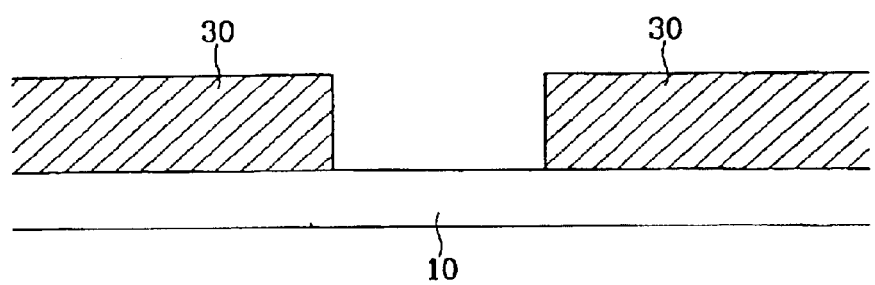
FIGS. 3A, 3B, 3C, 3D and 3E sequentially illustrate the steps of fabricating a color filter substrate for a liquid crystal display according to a second preferred embodiment of the present invention.

As shown in FIG. 3A, color filters 30 of red, green and blue colors are formed on a transparent insulating substrate 10 through performing photography three times. That is, as related to each color, a layer based on a photosensitive material containing pigment is deposited onto the substrate 10, exposed to light through a mask, and developed. A groove is formed at a predetermined portion in order to make a domain partitioning pattern) of each color filter 30, and at the area between the neighboring color filters 30. It is preferable that the groove be deep enough to expose the underlying transparent substrate 10.

Figure 3B:
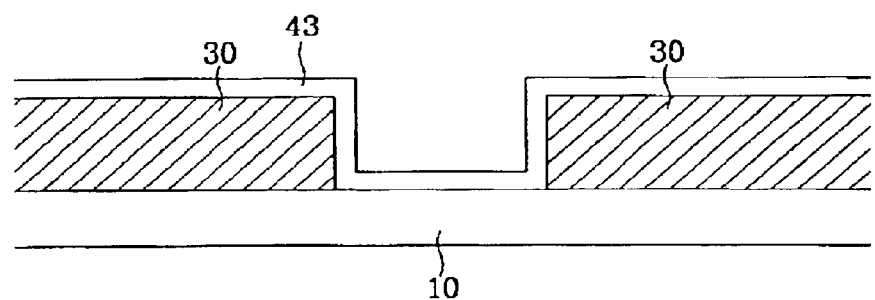

As shown in FIG. 3B, a first common electrode 43 is formed on the color filters 30 with a transparent conductive material such as indium tin oxide (ITO) and indium zinc oxide (IZO).

Figure 3C:
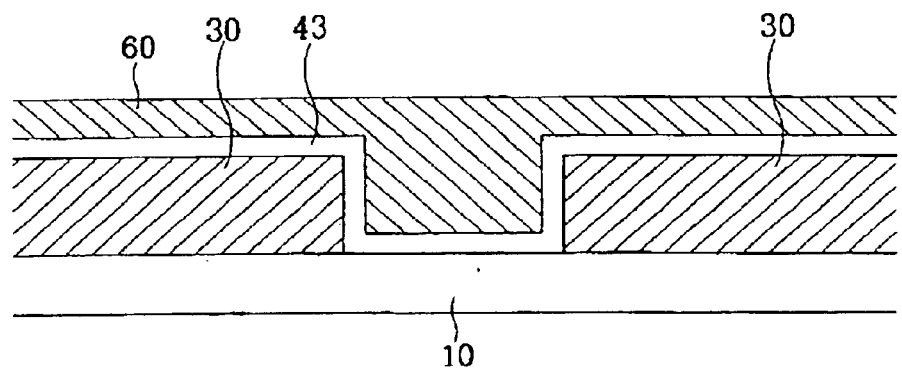

As shown in FIG. 3C, an organic black matrix 60 is formed on the first common electrode 43.

Figure 3D:
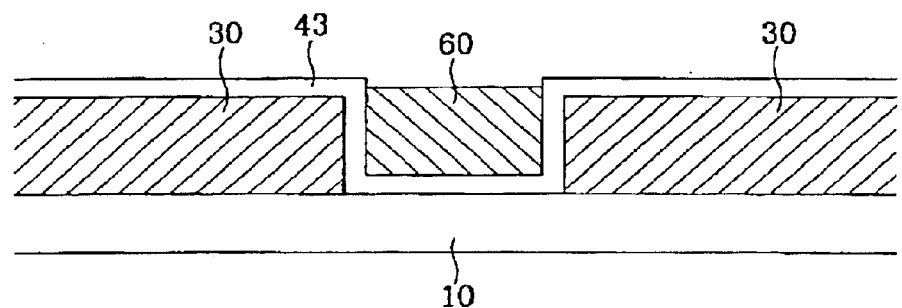

As shown in FIG. 3D, the organic black matrix 60 suffers ashing through dry etching such that only the portion thereof at the groove is left over while filling the groove, and other portions are all removed.

Figure 3E:
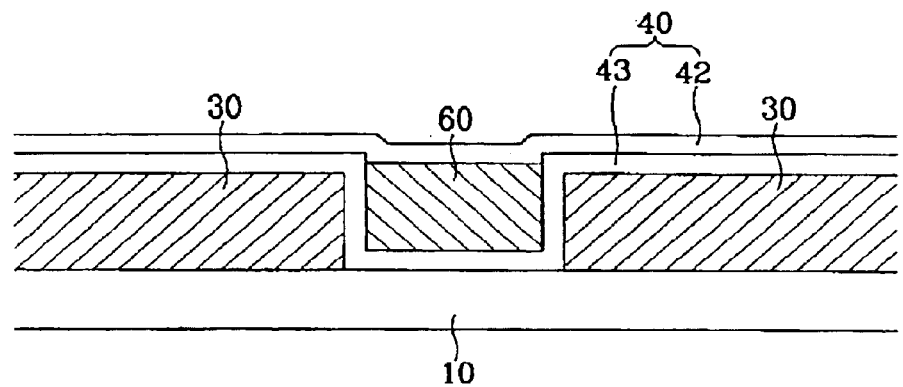

In this way, a color filter substrate is completed. However, when the organic black matrix 60 contacts the liquid crystal, the liquid crystal material may be contaminated due to pigment, and this causes occurrence of after-image. In order to solve such a problem, as shown in FIG. 3E, a second common electrode 42 may be formed on the first common electrode 43 with a transparent conductive material to cover the organic black matrix 60.

FIGS. 4A through 4F illustrate the steps of fabricating a color filter substrate for a liquid crystal display according to a third preferred embodiment of the present invention.

Figure 4A:
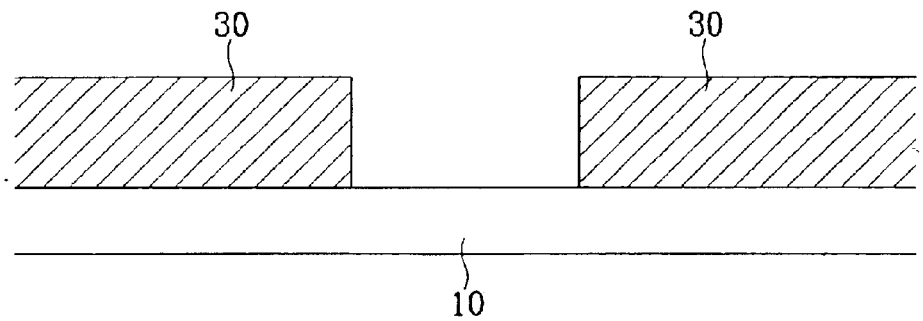
FIGS. 4A, 4B, 4C, 4D, 4E and 4F sequentially illustrate the steps of fabricating a color filter substrate for a liquid crystal display according to a third preferred embodiment of the present invention.

As shown in FIG. 4A, color filters 30 of red, green and blue colors are formed on a transparent insulating substrate 10 through performing photography three times. A groove is formed at a predetermined portion (in order to make a domain partitioning pattern) of each color filter 30, and at the area between the neighboring color filters 30. It is preferable that the groove should be deep enough to expose the underlying transparent substrate 10. The width of the groove is preferably in the range of 5–15 µm, more preferably about 8 µm.

Figure 4B:
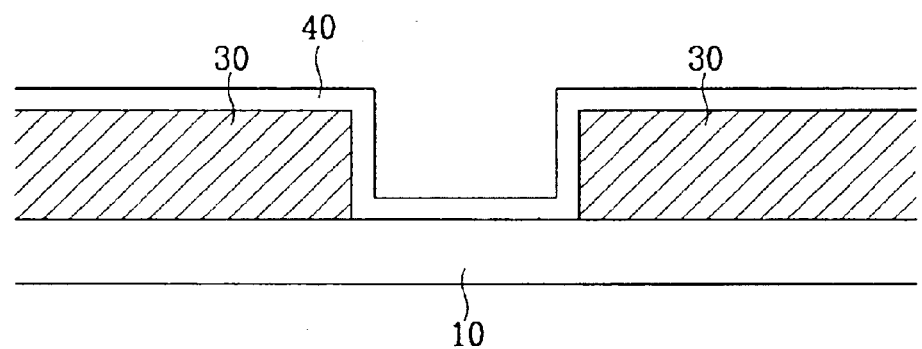

As shown in FIG. 4B, a common electrode 40 is formed on the color filters 30 with a transparent conductive material such as indium tin oxide (ITO) and indium zinc oxide (IZO).

Figure 4C:
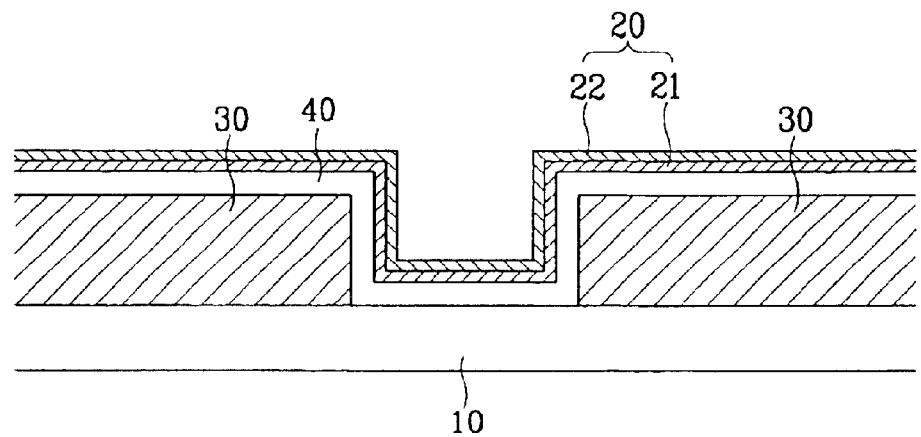

As shown in FIG. 4C, a chrome oxide layer 21, and a chrome layer 22 are sequentially deposited onto the common electrode 40 to thereby form a black matrix layer 20.

Figure 4D:
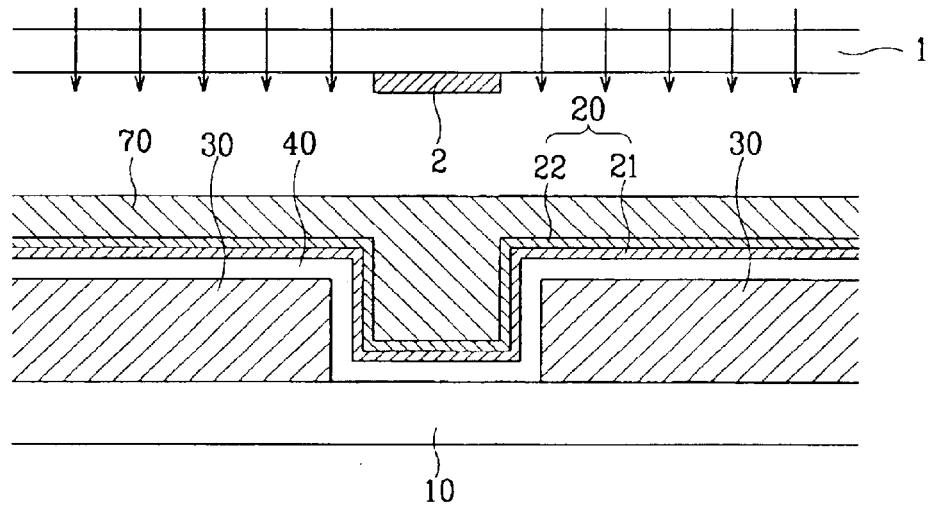

As shown in FIG. 4D, a photosensitive film 70 is formed on the black matrix layer 20 with a photosensitive material, and exposed to light through a mask 1 with a light interception pattern 2. It is preferable that the photosensitive film 70 should bear a thin thickness of 0.5–3.5 µm while filling the groove. The mask may be structured such that either the portion thereof placed over the groove intercepts light while transmitting the light at other portions (in the case of a negative photoresist film), or the portion thereof placed over the groove transmits light while intercepting the light at other portions (in the case of a positive photoresist film). The mask may be provided with a slit pattern, or a semitransparent film. That is, the portion of the mask with the slit pattern or the semitransparent film is placed over the groove while reducing the amount of light illumination thereto such that the remaining photosensitive film 70 through the developing process only fills the groove. Alternatively, the time period of light exposing may be varied to control the thickness of the remaining photosensitive film 70 without using a mask.

Figure 4E:
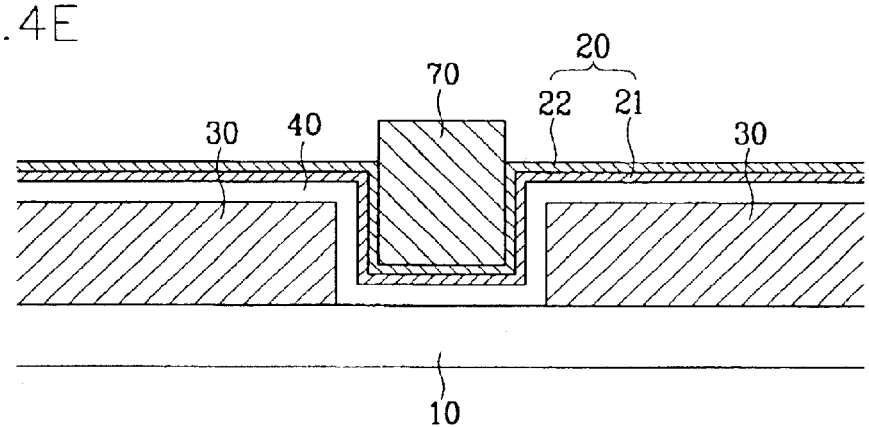

As shown in FIG. 4E, the photosensitive film 70 is developed so that only the portion thereof placed over the groove is left over, and other portions are all removed while exposing the underlying black matrix layer 20.

Figure 4F:
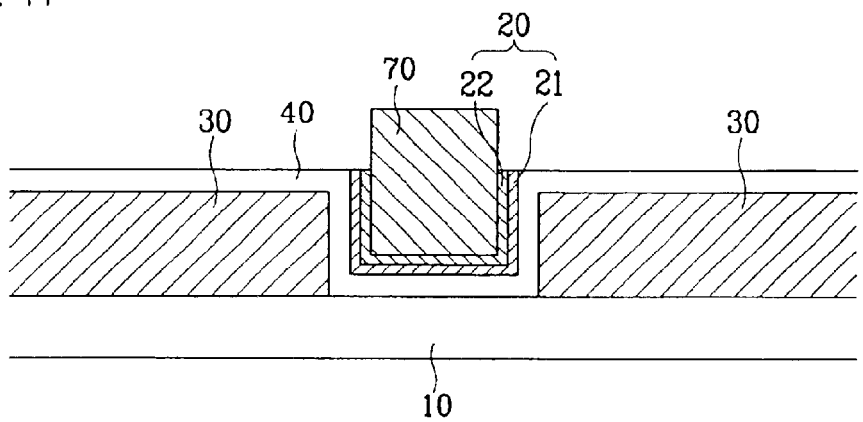

Finally, as shown in FIG. 4F, the exposed portion of the black matrix layer 20 is removed through etching. The black matrix layer 20 formed at the groove is not etched while being protected by the photosensitive film 70.

In this process, only photography is made three times without introducing photolithography.

FIGS. 5A through 5F illustrate the steps of fabricating a color filter substrate for a liquid crystal display according to a fourth preferred embodiment of the present invention.

Figure 5A:
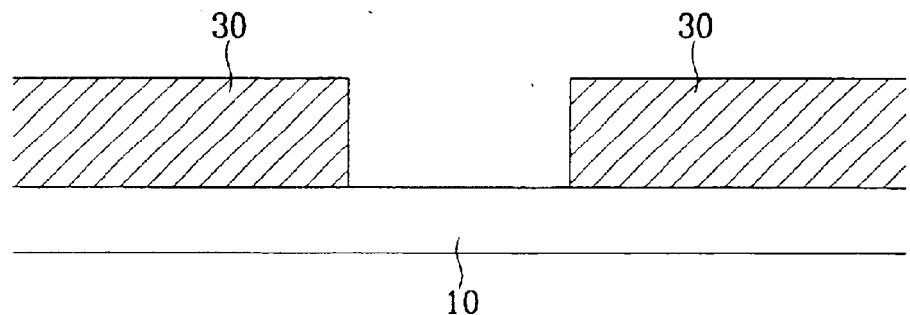
FIGS. 5A, 5B, 5C, 5D, 5E and 5F sequentially illustrate the steps of fabricating a color filter substrate for a liquid crystal display according to a fourth preferred embodiment of the present invention.

As shown in FIG. 5A, color filters 30 of red, green and blue are formed on a transparent insulating substrate 10 through performing photography three times. A groove is formed at a predetermined portion (in order to make a domain partitioning pattern) of each color filter 30, and at the area between the neighboring color filters 30. It is preferable that the groove should be deep enough to expose the underlying transparent substrate 10. The width of the groove is preferably in the range of 5–15 µm, more preferably about 8 µm.

Figure 5B:
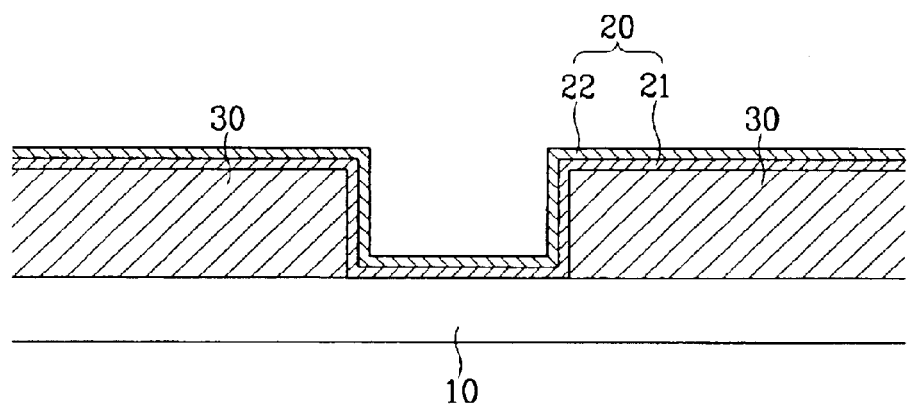

As shown in FIG. 5B, a chrome oxide layer 21, and a chrome layer 22 are sequentially deposited onto the color filters 30 to form a black matrix layer 20.

Figure 5C:
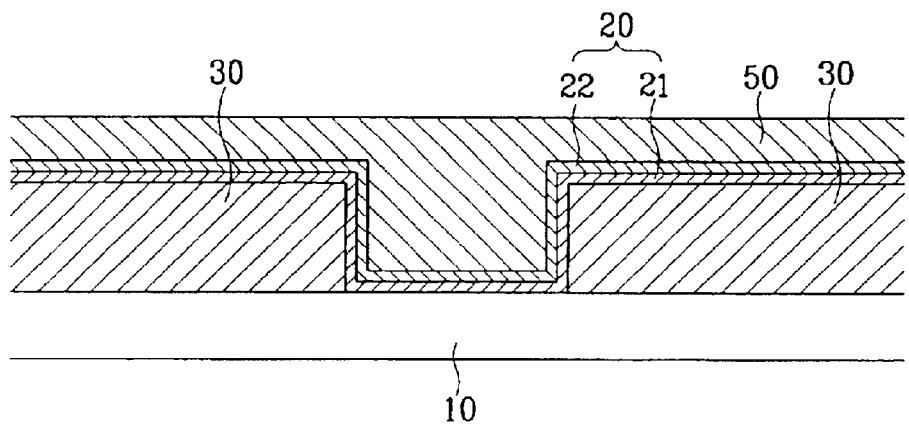

As shown in FIG. 5C, an organic film 50 is coated onto the black matrix layer 20. The organic film 50 may be formed with an acryl-based material, or a BCB-based material. The BCB-based material is preferred for the organic film 50 in view of wide viewing angle characteristic. The organic film 50 preferably has a thin thickness of 0.5–3.5 µm while filling the groove.

Figure 5D:
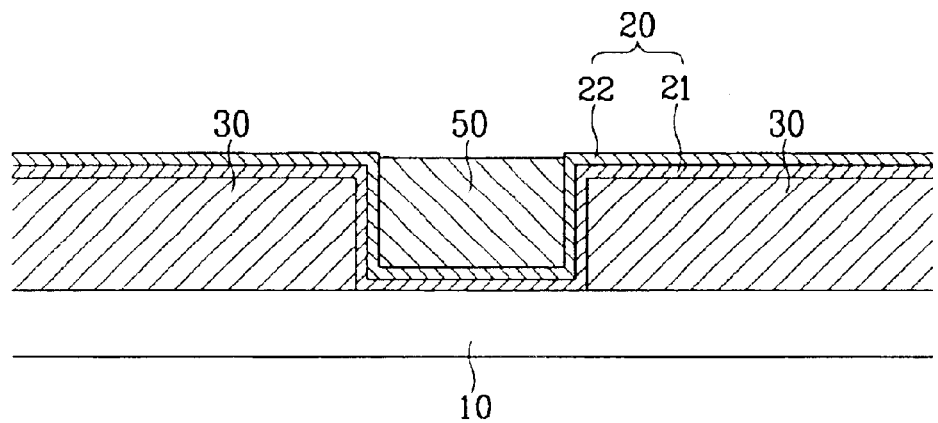

As shown in FIG. 5D, the organic film 50 suffers ashing through dry etching, leaving only the portion placed at the groove. And other portions are all removed while exposing the underlying black matrix layer 20. At this time, over-etching of 5–50% is preferably made to obtain sufficient margin.

Figure 5E:
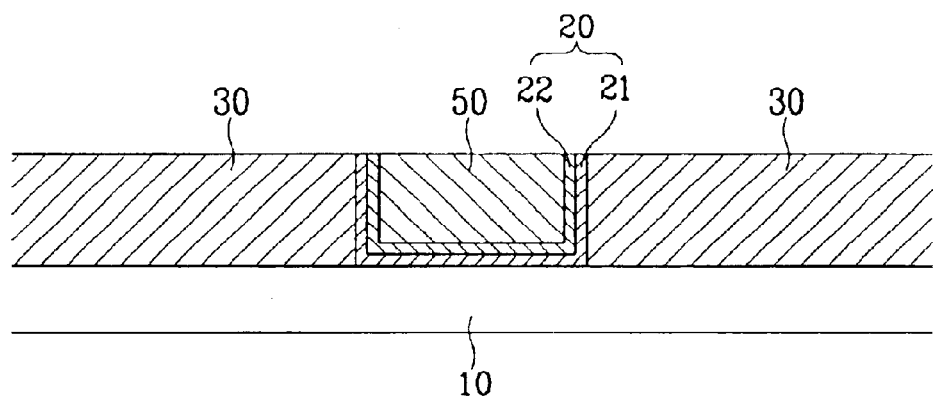

As shown in FIG. 5E, the exposed portion of the black matrix layer 20 is removed through etching. At this time, the portion of the black matrix layer 20 at the groove is left over while being protected by the organic film 50.

Figure 5F:
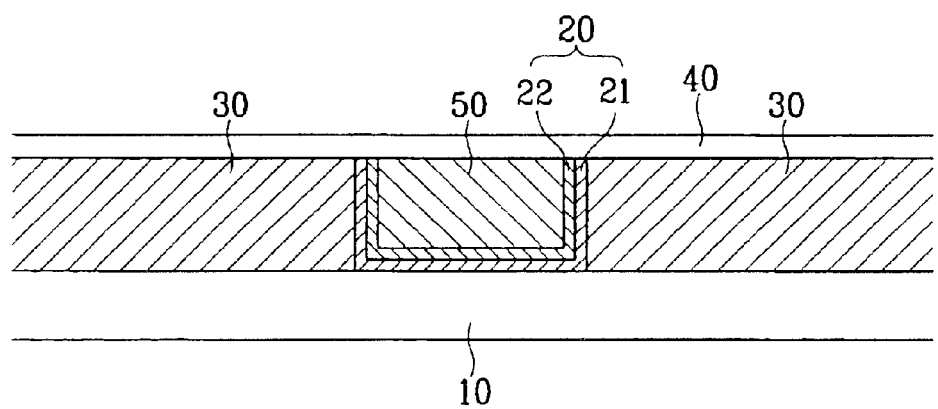

Finally, as shown in FIG. 5F, a common electrode 40 is formed on the color filters 30 and the organic film 50 with a transparent conductive material such as indium tin oxide (ITO) and indium zinc oxide (IZO).

Consequently, a color filter substrate is completed. In such a color filter substrate, as different from the color filter substrate related to the previous preferred embodiments, the organic film 50 only fills the groove, but does not control the inclining directions of the liquid crystal molecules.

Alternatively, an organic black matrix may be used instead of the double-layered black matrix 20 made of the chrome layer and the chrome oxide layer. In this case, the color filter substrate is fabricated through the steps of color filter formation, organic black matrix coating, organic black matrix ashing, and common electrode formation.

In the above process, only photography is made three times without introducing photolithography. Therefore, compared to the conventional process of fabricating a TN mode color filter substrate, such a process of the present invention eliminates one step of photolithography.

Figure 6A:
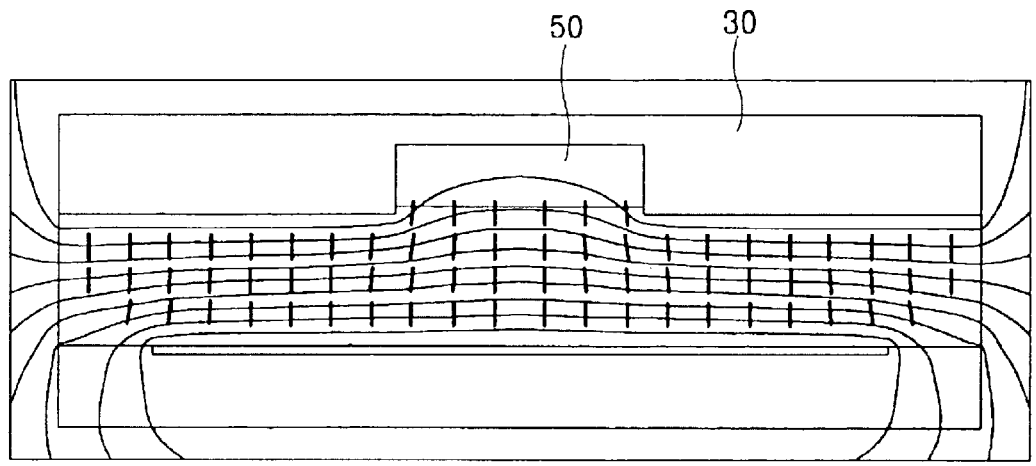
FIGS. 6A and 6B are sectional views illustrating the orientation state of liquid crystal molecules under the application of voltages to a common electrode and a pixel electrode for the liquid crystal displays according to the preferred embodiments of the present invention.
Figure 6B:
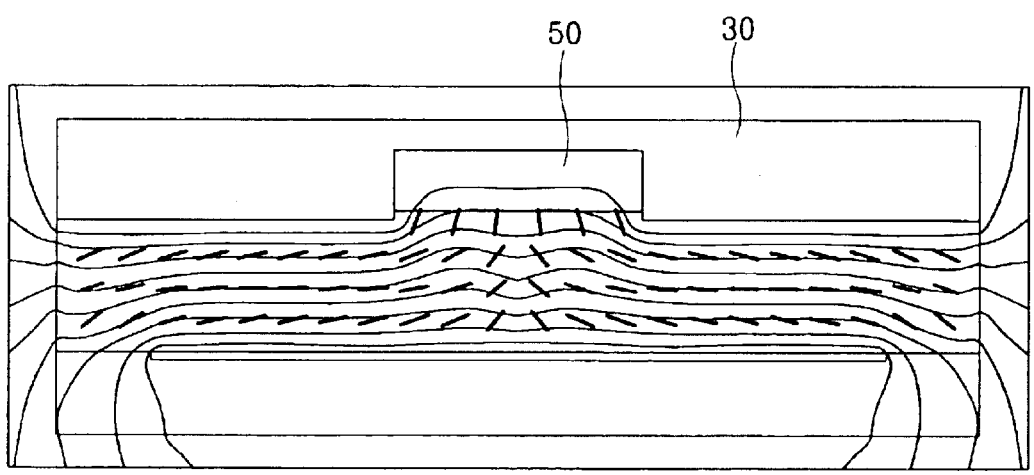

FIGS. 6A and 6B illustrate the orientation of liquid crystal molecules under the application of voltages to a common electrode and a pixel electrode in the liquid crystal displays according to the preferred embodiments of the present invention at the initial stage of voltage application and at the 20 msec later stage thereof, respectively.

As shown in FIGS. 6A and 6B, equipotential lines are bent due to the groove as well as the organic film or the photosensitive film filling the groove, and electric fields proceeding perpendicular to the equipotential lines are also bent. For this reason, the inclining directions of the liquid crystal molecules are made toward predetermined destinations. That is, the liquid crystal molecules at either side of the groove are inclined in the directions opposite to each other. This effect is the same as that related to the opening portion in the PVA mode liquid crystal display.

Figure 7A:
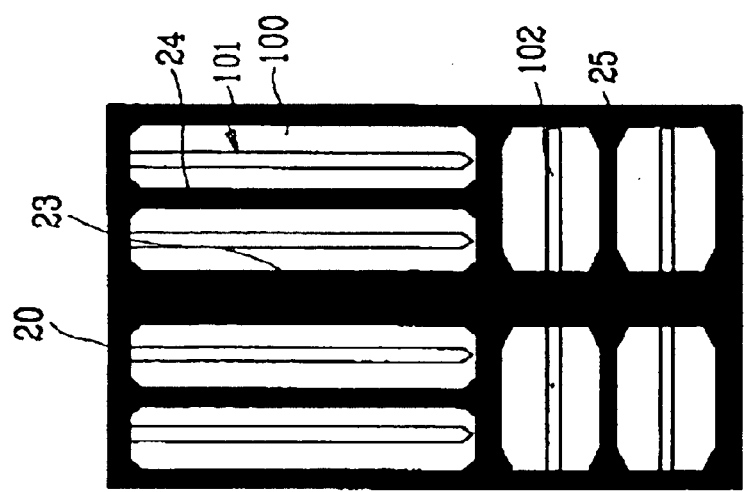
FIG. 7A is a schematic view of a black matrix of a color filter substrate for a liquid crystal display according to a fifth preferred embodiment of the present invention.

FIG. 7A is a schematic view of a black matrix of a color filter substrate for a liquid crystal display according to a fifth preferred embodiment of the present invention.

FIG. 7A illustrates a pattern of a black matrix 20 corresponding to two pixel electrodes. The black matrix 20 has first portions 23 with a large width that divide the neighboring pixel regions, and second portions 24 and 25 with a small width that partition one pixel region into plural numbers of micro-regions. The second portions of the black matrix 20 are classified into horizontal portions 24 and vertical portions 25. Such a black matrix 20 partitions one pixel region into four micro-regions.

Figure 7B:
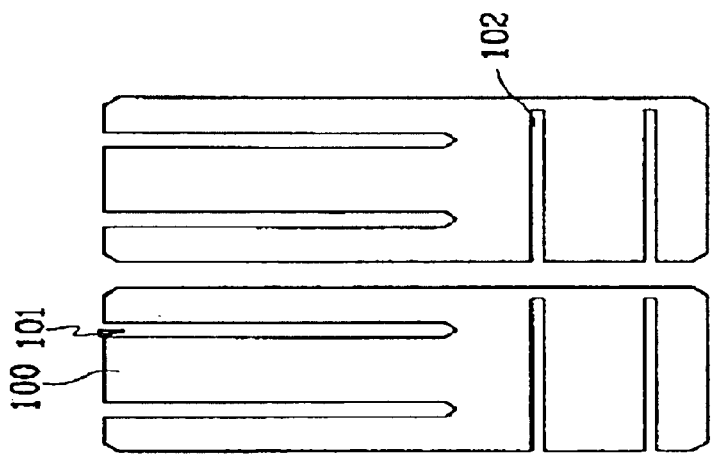
FIG. 7B is a schematic view of a thin film transistor array substrate for the liquid crystal display according to the fifth preferred embodiment of the present invention.

FIG. 7B is a schematic view of a pixel electrode of a thin film transistor array substrate for the liquid crystal display according to the fifth preferred embodiment of the present invention.

The pixel electrode 100 has two vertical opening portions 101, and two horizontal opening portions 102.

Figure 7C:
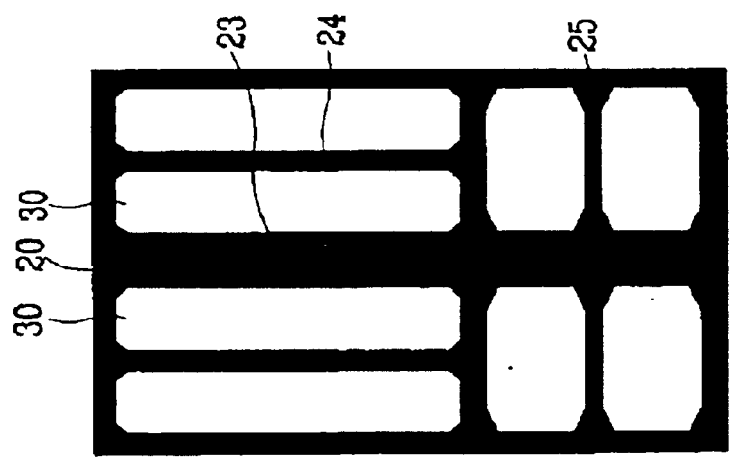
FIG. 7C is a schematic view of the liquid crystal display where the color filter substrate shown in FIG. 7A and the thin film transistor array substrate shown in FIG. 7B are assembled with each other.

FIG. 7C illustrates the state of assembling the color filter substrate shown in FIG. 7A and the thin film transistor array substrate shown in FIG. 7B with each other.

The opening portions 101 and 102 of the pixel electrode 100 are arranged between the portions of the black matrix 20. One pixel region is partitioned into eight micro-regions by way of the opening portions 101 and 102 of the pixel electrode 100 and the black matrix 20. The eight micro-regions proceed longitudinally in the horizontal and vertical directions four by four. In the four vertical regions, the liquid crystal molecules at the two regions are inclined toward east, and those at the two regions are inclined toward west. In the four horizontal regions, the liquid crystal molecules at the two regions are inclined toward south, and those at the two regions are inclined toward north. In this way, the liquid crystal molecules are uniformly inclined in four directions so that good picture images can be produced in any viewing direction.

Figure 8C:
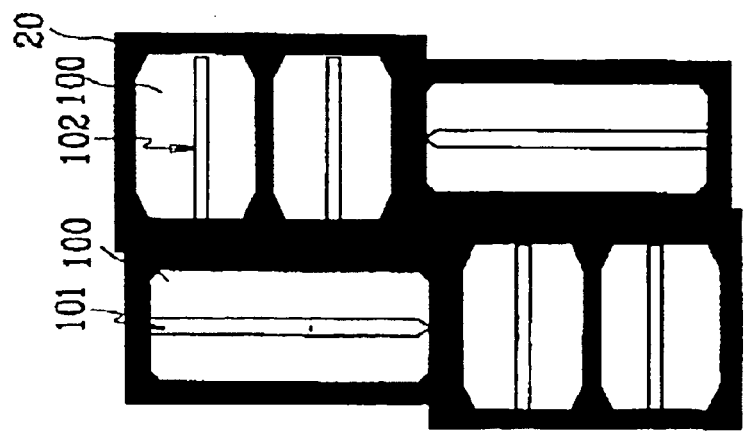
FIG. 8C is a schematic view of the liquid crystal display where the color filter substrate shown in FIG. 8A and the thin film transistor array substrate shown in FIG. 8B are assembled with each other.
Figure 8B:
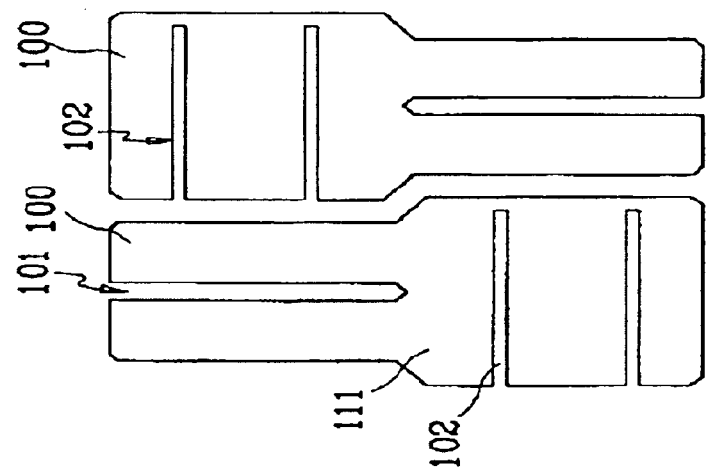
FIG. 8B is a schematic view of a thin film transistor array substrate for the liquid crystal display according to the sixth preferred embodiment of the present invention.
Figure 8A:
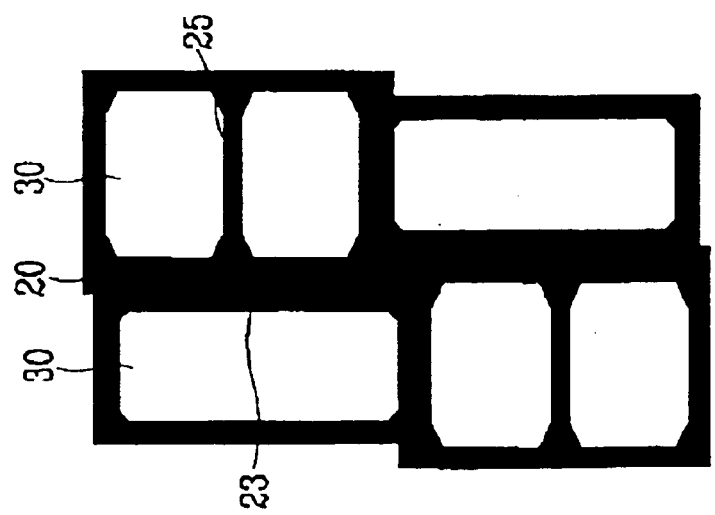
FIG. 8A is a schematic view of a black matrix of a color filter substrate for a liquid crystal display according to a sixth preferred embodiment of the present invention.

FIG. 8A is a schematic view of a black matrix of a color filter substrate for a liquid crystal display according to a sixth preferred embodiment of the present invention.

The black matrix 20 has first portions 23 with a large width that divide the neighboring pixel regions, and a second portion 25 with a small width that partition one pixel region into a number of micro-regions. Such a black matrix 20 partitions one pixel region into three micro-regions. The two micro-regions partitioned by the second portion 25 have the same horizontal width, but the remaining micro-region has a relatively narrow horizontal width.

FIG. 8B is a schematic view of a pixel electrode of a thin film transistor array substrate for the liquid crystal display according to the sixth preferred embodiment of the present invention.

The pixel electrode 100 bears a first region with a small width, and a second region with a large width. A first opening portion 101 is longitudinally extended at the first region of the pixel electrode 100 in the vertical direction, and two second opening portions 102 are longitudinally extended at the second region of the pixel electrode 100 in the horizontal direction. The first region of the pixel electrode 100 is bisected by way of the first opening portion 101 left and right, and the second region of the pixel electrode 100 is trisected by way of the second opening portions 102 up and down. Among the trisected micro-regions, the width of the center micro-region is two times as large as the two side micro-regions.

FIG. 8C illustrates the state of assembling the color filter substrate shown in FIG. 8A and the thin film transistor array substrate shown in FIG. 8B with each other.

One pixel region is partitioned into six micro-regions by way of the opening portions 101 and 102 of the pixel electrode 100 and the black matrix 20. The effect pursuant to the partitioning of the pixel region are the same as described with reference to FIGS. 7A, 7B and 7C. That is, wide viewing angle characteristic can be obtained in an effective manner.

As described above, in the inventive liquid crystal display, the color filter substrate can be fabricated in a simplified manner. Furthermore, as the black matrix is formed by way of self alignment, decrease in the opening ratio due to the misalignment of the mask during the black matrix formation process can be prevented.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A color filter substrate for a liquid crystal display, comprising:
   a transparent substrate;
   a plurality of color filters formed on the transparent substrate, each color filter having a groove formed therein;
   a first transparent conductive layer covering the color filter; and
   a black matrix formed on the first transparent conductive layer within the groove.

2. The color filter substrate of claim 1, further comprising an organic film formed on the black matrix and filling the groove.

3. The color filter substrate of claim 2, wherein the black matrix has a double-layered structure comprising chrome and chrome oxide.

4. The color filter substrate of claim 1, further comprising a photosensitive film formed on the black matrix and filling the groove.

5. The color filter substrate of claim 4, wherein the black matrix has a double-layered structure comprising chrome and chrome oxide.

6. The color filter substrate of claim 1, wherein the black matrix is formed of an organic material and filling the groove.

7. The color filter substrate of claim 6, further comprising a second transparent conductive layer covering the black matrix.

8. The color filter substrate of claim 1, wherein the black matrix comprises a first portion formed between the neighboring color filters, and a second portion formed within each color filter to divide the color filter into a plurality of domains.

* * * * *